(12) United States Patent
Earley et al.

(10) Patent No.: US 10,735,819 B2
(45) Date of Patent: Aug. 4, 2020

(54) METHOD AND APPARATUS FOR CONCURRENT BROADCAST OF MEDIA PROGRAM AND SOCIAL NETWORKING DERIVED INFORMATION EXCHANGE

(71) Applicant: Fox Broadcasting Company, Los Angeles, CA (US)

(72) Inventors: Joseph B. Earley, Los Angeles, CA (US); Tedd Charles Rosenfeld, Tarzana, CA (US); Steven Edward Simonian, Los Angeles, CA (US)

(73) Assignee: FOX BROADCASTING COMPANY, LLC, Los Angeles, CA (US)

( * ) Notice: Subject to any disclaimer, the term of this patent is extended or adjusted under 35 U.S.C. 154(b) by 9 days.

(21) Appl. No.: 15/980,582

(22) Filed: May 15, 2018

(65) Prior Publication Data
US 2018/0338182 A1     Nov. 22, 2018

Related U.S. Application Data

(63) Continuation of application No. 12/875,954, filed on Sep. 3, 2010, now Pat. No. 9,973,821.

(60) Provisional application No. 61/239,766, filed on Sep. 3, 2009.

(51) Int. Cl.
| | |
|---|---|
| *H04N 21/4788* | (2011.01) |
| *H04L 12/18* | (2006.01) |
| *H04L 12/58* | (2006.01) |
| *H04N 21/258* | (2011.01) |
| *H04L 29/06* | (2006.01) |

(52) U.S. Cl.
CPC ..... *H04N 21/4788* (2013.01); *H04L 12/1822* (2013.01); *H04L 51/32* (2013.01); *H04L 65/4015* (2013.01); *H04L 65/4076* (2013.01); *H04N 21/25891* (2013.01); *H04L 51/14* (2013.01)

(58) Field of Classification Search
CPC ............ H04N 21/4788; H04L 12/1822; H04L 12/588; H04L 65/4015; H04L 12/5885
See application file for complete search history.

(56) References Cited

U.S. PATENT DOCUMENTS

| | | |
|---|---|---|
| 6,571,234 B1 | 5/2003 | Knight et al. |
| 8,151,292 B2 | 4/2012 | Lee et al. |
| 2002/0069415 A1 | 6/2002 | Humbard et al. |
| 2002/0108125 A1 | 8/2002 | Joao |
| 2005/0125843 A1 | 6/2005 | Okezie et al. |

(Continued)

OTHER PUBLICATIONS

Burbank, J., "Could Social Networking Bolster the 30 Second Spot?", Neilsen Online, Mar. 10, 2009, http://blog.nielsen.com/nielsenwire/global/could-social-networking-bolster-the-30-second-spot/.

(Continued)

*Primary Examiner* — Nasser M Goodarzi
*Assistant Examiner* — Patrick A Ryan
(74) *Attorney, Agent, or Firm* — Gates & Cooper LLP

(57) ABSTRACT

A method and apparatus for presenting a media program concurrently with viewer questions and live commentary about the media program is disclosed. As the media program is broadcasted, messages from the first group regarding the media program are accepted. The accepted messages are filtered to identify suitable messages of interest and to present only those messages to a second group for comment. The identified messages from the first group and comments (Continued)

from the second group are added to the broadcast media program concurrently or in real time.

20 Claims, 6 Drawing Sheets

(56) References Cited

U.S. PATENT DOCUMENTS

2006/0179454 A1  8/2006  Shusman
2009/0164904 A1  6/2009  Horowitz et al.

OTHER PUBLICATIONS

"Directv and Havoc TV Put Viewers in Charge with Havoc on the 101 Debuting April 4," Business Wire, Apr. 3, 2007.
Eaton, K., "Fox's Fringe Twitter-Feed Overlay: Clever or a Mistake?", The Hollywood Reporter, Aug. 31, 2009.
Grant, R., "Watch and Tweet Live," Mar. 28, 2009, http://wearesocial.net/blog/2009/03/watch-tweet-live/.

METHOD AND APPARATUS FOR CONCURRENT BROADCAST OF MEDIA PROGRAM AND SOCIAL NETWORKING DERIVED INFORMATION EXCHANGE

CROSS REFERENCE TO RELATED APPLICATIONS

This application is a continuation of U.S. patent application Ser. No. 12/875,954, entitled "METHOD AND APPARATUS FOR CONCURRENT BROADCAST OF MEDIA PROGRAM AND SOCIAL NETWORKING DERIVED INFORMATION EXCHANGE," by Joseph Earley et al., filed Sep. 3, 2010, now issued as U.S. Pat. No. 9,973,821, which application claims benefit of U.S. Provisional Patent Application No. 61/239,766, entitled "METHOD AND APPARATUS FOR CONCURRENT BROADCAST OF MEDIA PROGRAM AND SOCIAL NETWORKING DERIVED INFORMATION," by Joseph Earley et al., filed Sep. 3, 2009, both of which applications are hereby incorporated by reference herein.

BACKGROUND OF THE INVENTION

1. Field of the Invention

The present invention relates to systems and methods for providing media programs to viewers, and in particular to a system and method for augmenting provided media programs with qualified answers to questions from viewers live and in near real time.

2. Description of the Related Art

Systems for broadcasting media programs to viewers have been available for many years. The earliest of such systems used terrestrially broadcast television signals, that were received by television sets and presented to viewers in their homes. Later, media programs were also provided by means of cable transmission, and still later, satellite transmission. These programs were typically transmitted in modulated form, using frequency or time domain multiplexing to provide different channels. These means for providing media programs have recently been augmented by the Internet. Media programs transmitted via the Internet may be ultimately transmitted by terrestrial transmission, satellite or cable transmission, copper wire, or fiber optics, but the notion of channels is instead implemented via using different uniform resource locators (URLs) for each media program.

Regardless of the means of transmission or providing multiple channels, the presentation of media programs, at least by means of broadcast, has been paid for by incorporating commercials into those programs. To maximize the value of the broadcasted media program, it is desired for the commercials of that media program to viewed by as many people as possible.

There are at least two factors that reduce the number of viewers watching the commercials broadcast with media programs. The first factor is the media program itself. The production of a media program is an expensive endeavor . . . prohibitively expensive to provide nothing but premiered media programs with each broadcast. Hence, many media programs are rebroadcasted at later times. In many cases, such rebroadcasts draw fewer viewers than the premier broadcast, thus causing reduced revenue. The second factor is the advent of digital video recorders (DVRs). Such devices allow the user to easily record a media program for later viewing, and to rapidly skip over any commercials.

There is a need for a system and method for transmitting media programs that enhances viewership of rebroadcasts and disincentivizes the recording of such programs for later viewing. The present invention satisfies that need.

SUMMARY OF THE INVENTION

To address the requirements described above, the present invention discloses a method and apparatus for presenting a media program concurrently with live commentary about the media program. In one embodiment, the method is comprised of (1) broadcasting a media program, (2) accepting first commentary from a first group with a plurality of first group members, each viewing the broadcast of the media program, (3) filtering the messages from members of the first group to identify suitable messages of interest, (4) accepting messages from a second group having a plurality of second group members, each viewing the broadcast of the media program, and (5) adding at least one of the identified suitable messages from the first group and at least one the messages from the second group to the broadcasted signal in real time to concurrently present the (a) media program, (b) at least one identified suitable message from the first group and (c) at least one messages from the second group. The second group may consist or comprise of individuals designated to have knowledge of the production of the media program and the messages from the second group comprise the responses to the identified suitable messages of interest.

In another embodiment, apparatus is comprised of a media program transmission system, coupled to the social networking system, (1) for transmitting a broadcast signal having the media program and a social networking integration system, (2) for accepting first messages from a first group having a plurality of first group members, each viewing a broadcast of the media program, (3) for accepting second messages from a second group having at least one second group member viewing the broadcast of the media program, (4) for filtering the messages from the first group but not the second group to identify suitable messages of interest to substantially all the members of the first group, and (5) for adding at least one of the filtered messages from the first group and the messages from the second group to the broadcasted signal in real time, thereby concurrently presenting the media program, the identified suitable messages and at least one message from the second group.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
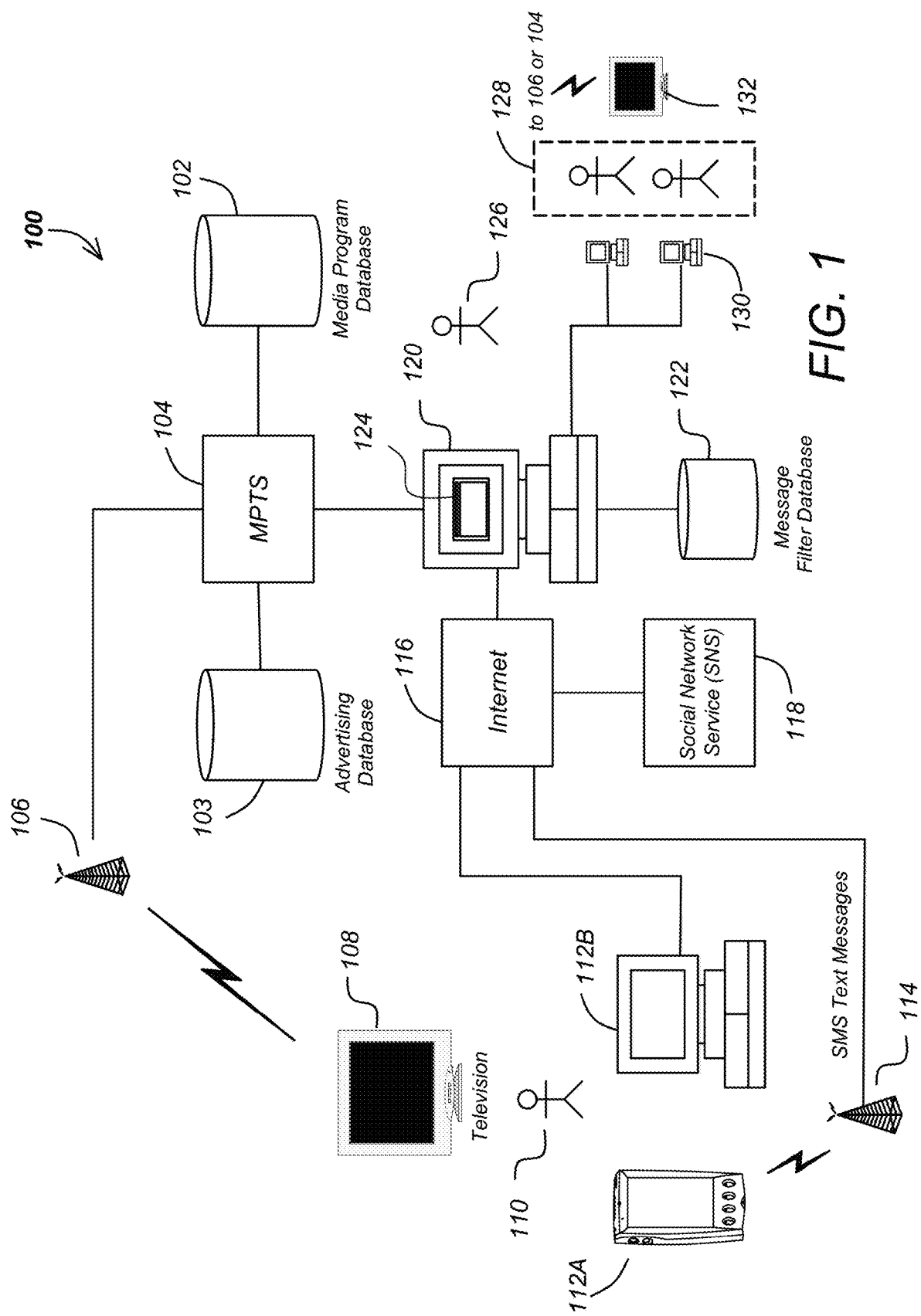
FIG. 1 is a block diagram showing an exemplary hardware environment for practicing the present invention.

FIG. 1 is a diagram depicting an enhanced broadcasting system (EBS) 100 that can be used to practice the present invention. The EBS 100 comprises a media program database 102 communicatively coupled to a media program transmission system (MPTS) 104. The media program database 102 stores media programs, and provides them to the MPTS 104 for broadcast or other transmission. The MPTS 104 also accepts advertisements from an advertising database 103, and incorporates those advertisements where desired in the media programs broadcast. The MPTS 104 may also accept information and media programs from other sources such as live feeds (not illustrated). The MPTS 104 provides the media programs and advertisements to the transmitter 106, which broadcasts the media programs and advertisements to the television(s) 108 of one or more viewer(s) 110. While the foregoing illustrates conventional terrestrial transmission, the transmission medium may be satellite, fiber optic, cable, or the Internet 116.

The viewer(s) 110 can watch the media program presented on the television 108, and if they have comments about the media program, provide such comments to the media program provider for broadcast to other viewers. This can be accomplished an interface device 112 such as a telephone 112A or computer 112B. Other devices such as a personal data assistant (PDA) can also be used. In one embodiment, the comments are text messages transmitted to the media program provider via an short message system (SMS) or similar protocol. In another embodiment, the comments are messages sent by computer 112B. In either case, messages can be sent in the form of e-mails, social networking transmissions (e.g. TWITTER messages or FACEBOOK wall posts to a profile designated by the media program provider), or a chatroom hosted by the media program provider. Messages received by telephone 112A are transmitted to a telephone receiver 114 and thence to a telephone service which provides such messages to addressed recipients, for example, via the Internet 116 or public switched telephone network (PSTN). Such messages can be transmitted directly to the media program provider (e.g. by e-mail using an address provided by the media program provider) or via a social networking service (SNS) such as TWITTER, FACEBOOK, or an chatroom host.

The messages are received by computer 120. Since the messages can be received from a variety of sources, the messages are collected, compiled and processed to remove unnecessary formatting, but to preserve content. In one embodiment, the source of the message (screen name, ID, FACEBOOK name, TWITTER ID) are retained so that the identity of the individual providing the comment can be retained and presented. In another embodiment, the identity of the individual providing the comment is removed. Message collection may involve "scraping" (e.g. copying text) of the messages from a browser 124 implemented on the computer 120.

The computer 120 may receive messages at a very rapid rate. Accordingly, provision is made to filter the messages to identify suitable (on topic, not including profanity or other objectionable language) messages that are most likely to be of interest to the group of viewers viewing the media program broadcast. Such filtering involves analyzing the messages for content, categorizing them, and present message categories and representative messages for selection. Preferably, this process takes place in real time or near real time. For example, if a comment or question is received about a particular scene in the media program, the value of that comment or question rapidly deteriorates after the scene has been broadcast and another scene has begun. Hence, the comment is best received, analyzed, and posted in very short order.

The first step in this process is analyzing the content of the received messages. This can be accomplished by parsing the messages to analyze them and removing words from the messages that are not likely to have content (e.g. words such as "the" "a" and the like), and compiling a list of the remaining words the received messages. These remaining words are then analyzed for tense, plurality and the other factors to obtain root words, and the root words are then histogrammed to determine which words are most commonly used in the messages. Since these messages are time-critical, this can be done in a first-in-first-out fashion, where the most commonly used words are identified as the most commonly used words in a preceding rolling time period. That time period can constant (e.g. 10 seconds) or can be selected based upon the scene length. For example, a longer FIFO period may be used to determine the most popular words used in comments or questions for a scene four minutes in length than one that is one minute in length.

Next, the messages are organized, using the most popular keywords used in the messages. For example, if one of the actors in the media program is named Bill Jones and many of the comments and/or questions arriving include the words "Bill" or "Jones", Bill Jones may be identified as a category. Further, such messages may include other information about Bill Jones, particularly those related to the scene currently being broadcast. This other information can be used to identify sub-categories. For example, if the scene involves a dangerous stunt, a number of viewers may have asked whether the actor performed the stunt or whether a stuntperson as used. In which case, a subcategory of "stunt" may be identified, and messages having the root "stunt" (e.g. stuntman or stunting) may be placed in this category. A synonym dictionary can be used to identify equivalent keywords.

Since the original messages are to be broadcast along with the media program, once a category or subject of interest has been identified by analyzing the incoming message, one of more messages of interest are be either automatically selected or presented to a producer 126 for selection. This can be accomplished by presenting candidate messages, organized by category, to the producer 126, for selection. In the process, the producer provides a final arbiter of which messages are displayed and which are not, taking into account how likely the message is to be well received or the content of the message. For example, messages having objectionable content can be identified and not chosen by the producer.

In one embodiment, the media program is also being concurrently viewed by a second group 128 which may consist of individuals designated by the media program provider to have knowledge about the production of the media program. Such people can include the producer, one or more of the actors, the cinematographer, for example. These individuals may be in contact with the producer 126, providing information regarding which, if any, of the messages received from viewers 110, the members of the second group 128 would like to respond to. For example, a viewer 110 message may ask a question regarding whether the actor Bill Jones performed the stunt in a scene. A member of the second group 128 (e.g. an actor) may wish to answer that question, and can indicate as such to the producer 126, so that the producer can select the message having that question for broadcast. The actor may enter his response to the question by suitable input to a terminal or a computer 130 communicatively coupled to the producer's computer 120, or such input can be verbally provided. One advantage of using the computer 130 for such input is that the actor (as well as others in the second group 128) need not be physically present to provide answers or input. In fact, input from the second group 128 may also be provided using the same means as the viewers 110 (e.g. using a computer, cellphone, personal data assistant or other device via TWITTER, FACEBOOK, short message service messages, or the Internet). Another advantage is that this paradigm makes second group messages available to the general public, because if messages are posted to the social networking or media forum, all fans (and not just ones participating in the broadcast event) will receive the messages. Communications between the second group 128 and the producer 126 may also be implemented via an Internet on line chat room with the producer 126 and the members of the second group 128 as chat room members. This allows the producer 126 and the second group 128 to receive and coordinate messages.

Using the computer 120, the producer 126 can select one or more of the incoming messages for broadcast along with the media program. The producer may submit the question or comment to the second group 128 or an individual from the second group 128, wait for a response from the individual and select both for broadcasting with the media program, or may select the question for broadcast, accept an answer or further comment from an individual in the second group 128, and post that answer, response, or further comment when received. Hence, the producer 126 can use the computer 120 to orchestrate the presentation of comments from the first group of individuals 110 and the second group of individuals 128, deciding which will be presented and at which time.

The input from the producer 126 is provided from the computer 120 to the MPTS 104 for broadcast along with the media program. In one embodiment, the messages are combined with the media program such that when they are displayed on the user's television 108, they are presented in a portion of the screen depicting the media program, much like a barker line. The portion of the screen dedicated to this task may be constant or varying. The messages may scroll across, vertically or horizontally. Typically, a stream of messages will comprise comments from the second group 128 about the production of the media program, questions from the first group 110 about the media program followed by answers to those questions from the second group 128.

In one embodiment, the messages are provided as closed captioning, using the technology appropriate for the broadcast system. NTSC, for example, used line 21 of the vertical blanking interval. For ATSC (digital television), three streams are encoded in the video, two backwards-compatible line 21 captions and a set of up to sixty-three additional captions encoded in the EIA-708 format, which is hereby incorporated by reference. Since sixty three captions are available, it is possible to allow users to select a different stream of information than other viewers. For example, viewers interested in the actor Bill Jones may choose a particular closed captioning channel to view the text stream regarding that actor. The different channels may be used to broadcast the text stream in different languages, or other categories . . . e.g. all actors instead of a particular actor. Channels may also be used to transmit comments, questions, and responses that are appropriate for different age groups.

The characters may be scrolled, popped up, or painted on. With scrolling the words appear from left to right, up to one line at a time; when a line is filled, the whole line scrolls up to make way for a new line, and the line on top is erased. The captions usually appear at the bottom of the screen, but can actually be placed anywhere (subject to appropriate approval by the studio producing the media program, producers, guilds and the like) to avoid covering graphics or action. For pop-ups, the text appears anywhere on the screen as a whole, followed by additional text. Painting on refers to the caption appearing on the screen letter by letter from left to right, but ends up like a stationary block.

In one embodiment, the members of the second group 128 view a version of the media program a period of time before it is actually broadcast. This allows the members of the second group to be prepare themselves for questions or comments that may be coming from the first group 110.

The foregoing includes the ability to perform live tweeting, respond to fan questions, or to perform scripted tweeting. With regard to live tweeting, members of the second group 128 may receive an advanced feed of comments/questions from the viewers in the first group 110, and provide additional comments/answers by providing text responses, either by text message, twitter, or entering data into computer 130. The advanced feed can be in the form of tweets or a chat room having individuals in the second group 128 as members. Text input from the second group members may be entered by third parties, or "handlers". The operator 126 may simply view the tweeted message on the computer 120 and enter the message into the computer 120 for transmission to the MPTS for broadcast, or the tweeted message may be automatically entered into the computer 120 upon receipt, and transmitted upon the producer's approval.

The foregoing can be used by the members of the second group 128 receiving questions or comments from the first group 110 (via television 132, computer, cellphone, personal data assistant or other device via TWITTER, FACEBOOK, short message service messages or the Internet) to respond to fan questions by receiving the incoming questions, coordinating responses in a chat room with other members of the second group 128 and the producer 126, then performing the same operations as for live tweeting.

Tweeting provides a prompt immediate response, and as described below, in a broadcast environment the members of the second group 128 responding to questions from the first (audience) group 110 will have the opportunity to view the program 15 to 20 seconds before the broadcast public, thus permitting the members of the second group 128 time to prepare for questions that might arise. However, in providing a tweet in conjunction with a live broadcast there may be a need to fill dead tweet space with either canned texts or questions. These canned messages can fill in time or provide fodder for questions or comments from viewing tweeters. In scripted tweeting the broadcaster prepares a series of canned tweets, such as "This is my first tweet . . . " or "I did this stunt for the first time . . . " in order to initiate discussion and questions from the viewing, twittering audience/For scripted tweeting, the operator 126 feeds a scripted tweet to a specific call # The call # is then communicated back to the second group 128, whereupon the individuals in the second group 128 can send out the scripted tweet via TWITTER.

Figure 2:
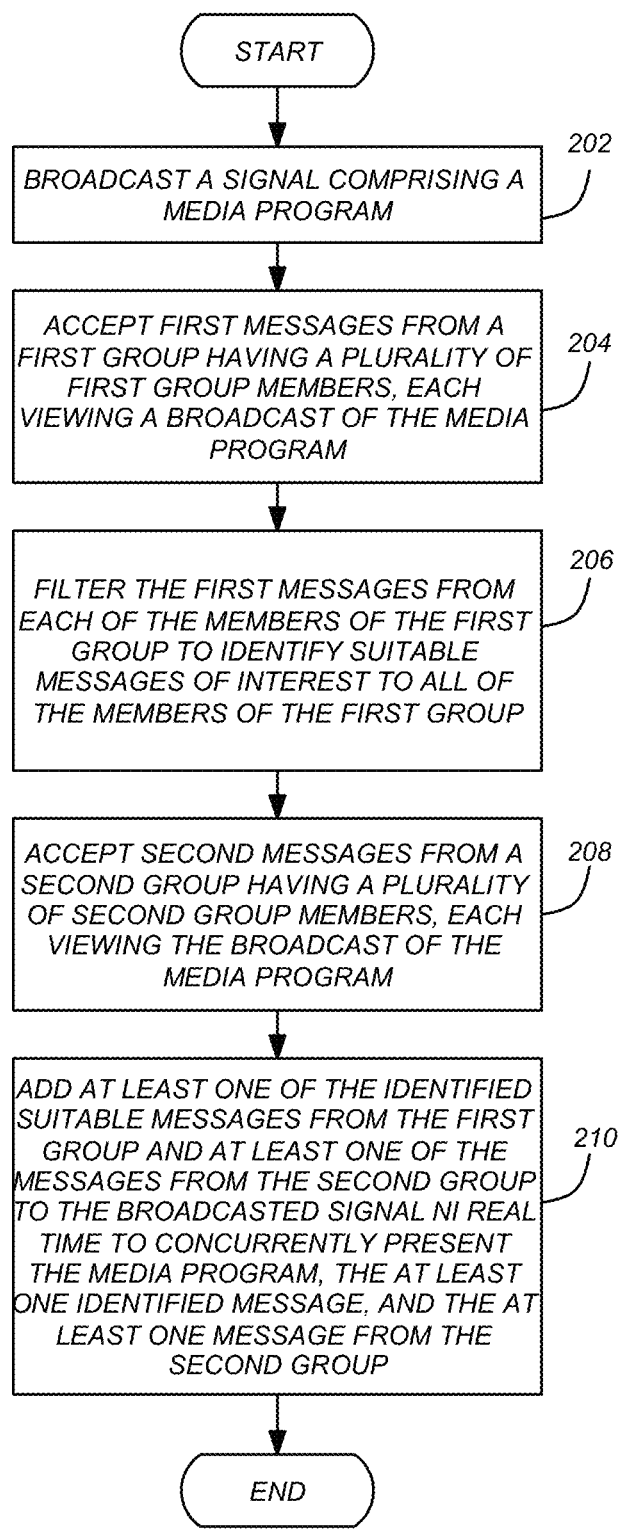
FIG. 2 is a diagram presenting exemplary method steps that can be used to practice one embodiment of the invention.

FIG. 2 is a diagram presenting exemplary method steps that can be used to practice one embodiment of the invention. A signal comprising the media program is broadcasted, as shown in block 202. One or more first messages are accepted from the first group 110 having a plurality of first group members viewing the broadcast of the media program, as shown in block 204. In one embodiment, this is accomplished by designating a TWITTER account for the broadcast of the media program and harvesting the first messages from the TWITTER account.

In block 206, the messages from members of the first group 110 are filtered to identify suitable messages of interest to other members of the first group. Messages from the second group 138 may also be filtered, but need not be.

In block 208, second messages are accepted from a second group 128 having a plurality of second group members viewing the broadcast of the media program. In one embodiment, the second group consists of individuals designated (e.g. by the broadcaster) to have knowledge of the production of the media program. The messages from the second group may be responses to the identified suitable messages from the first group.

Finally, as shown in block 210, at least one of the identified suitable messages from the first group 110 and at least one of the messages from the second group 138 are added to the broadcasted signal in real time, thus concurrently presenting the media program, the at least one identified messages and the message from the second group.

Figure 3:
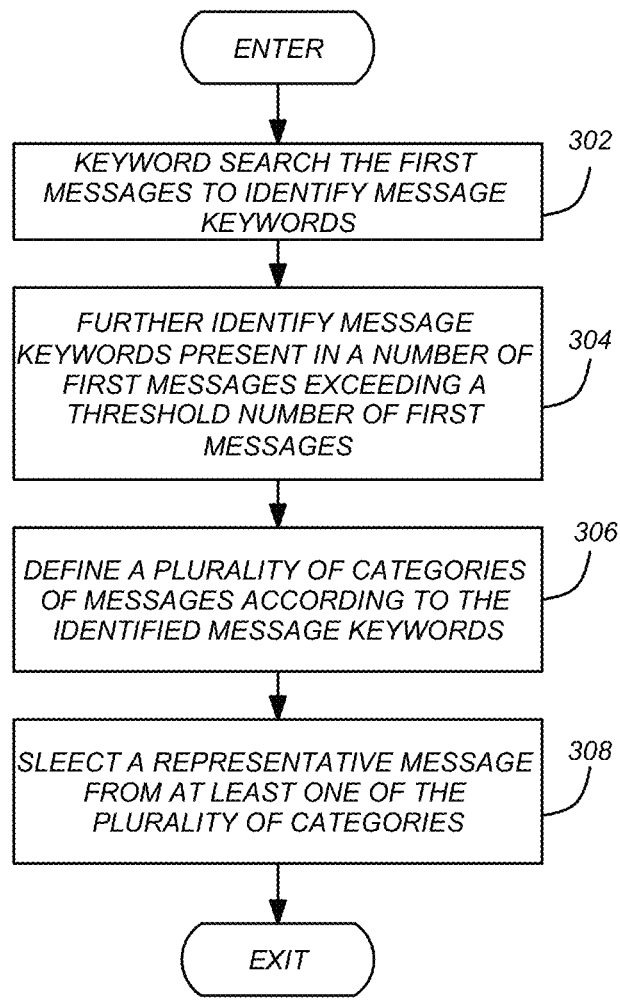
FIG. 3 is a diagram presenting exemplary method steps that can be used to filter the messages from the first group to identify suitable messages of interest to other first group members.

FIG. 3 is a diagram presenting exemplary method steps that can be used to filter the messages from the first group 110 to identify suitable messages of interest to other first group 110 members. The first messages received from the first group are keyword searched, as shown in block 302. Block 304 further identifies message keywords present in a number of first messages exceeding a threshold number of first messages. Block 306 defines a plurality of categories of messages according to the identified message keywords, and block 308 selects a representative message from at least one of the plurality of categories.

For example, block 302 may identify the word "stunt" as a keyword, and block 304 may further identify that the keyword "stunt" shows up in a threshold number or percentage (i.e. 20%) of the currently received first messages. Block 306 may define a category of "special effects" because the term stunts can be categorized as special effects, and block 308 may select one of the messages from the first group having the term "stunt" as a representative message.

Figure 4:
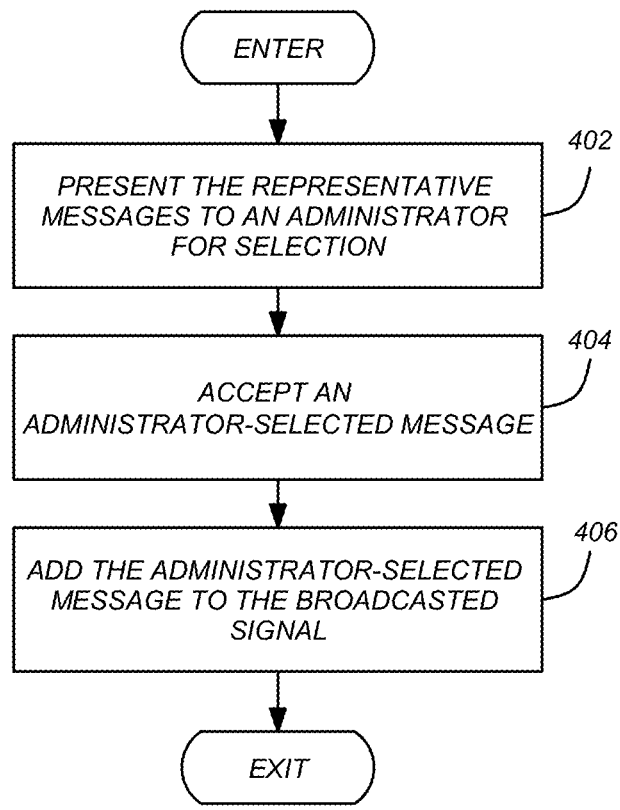
FIG. 4 is a diagram presenting exemplary method steps that can be used to practice a further embodiment of the invention wherein an producer selects messages for broadcast.

FIG. 4 is a diagram presenting exemplary method steps that can be used to practice a further embodiment of the invention wherein an administrator (such as producer 126) selects messages for broadcast. In block 402, the representative messages are presented to an administrator for selection. The administrator selects a message. The system accepts the message and ads the administrator-selected message to the broadacased signal, as shown in blocks 404 and 406.

Figure 5:
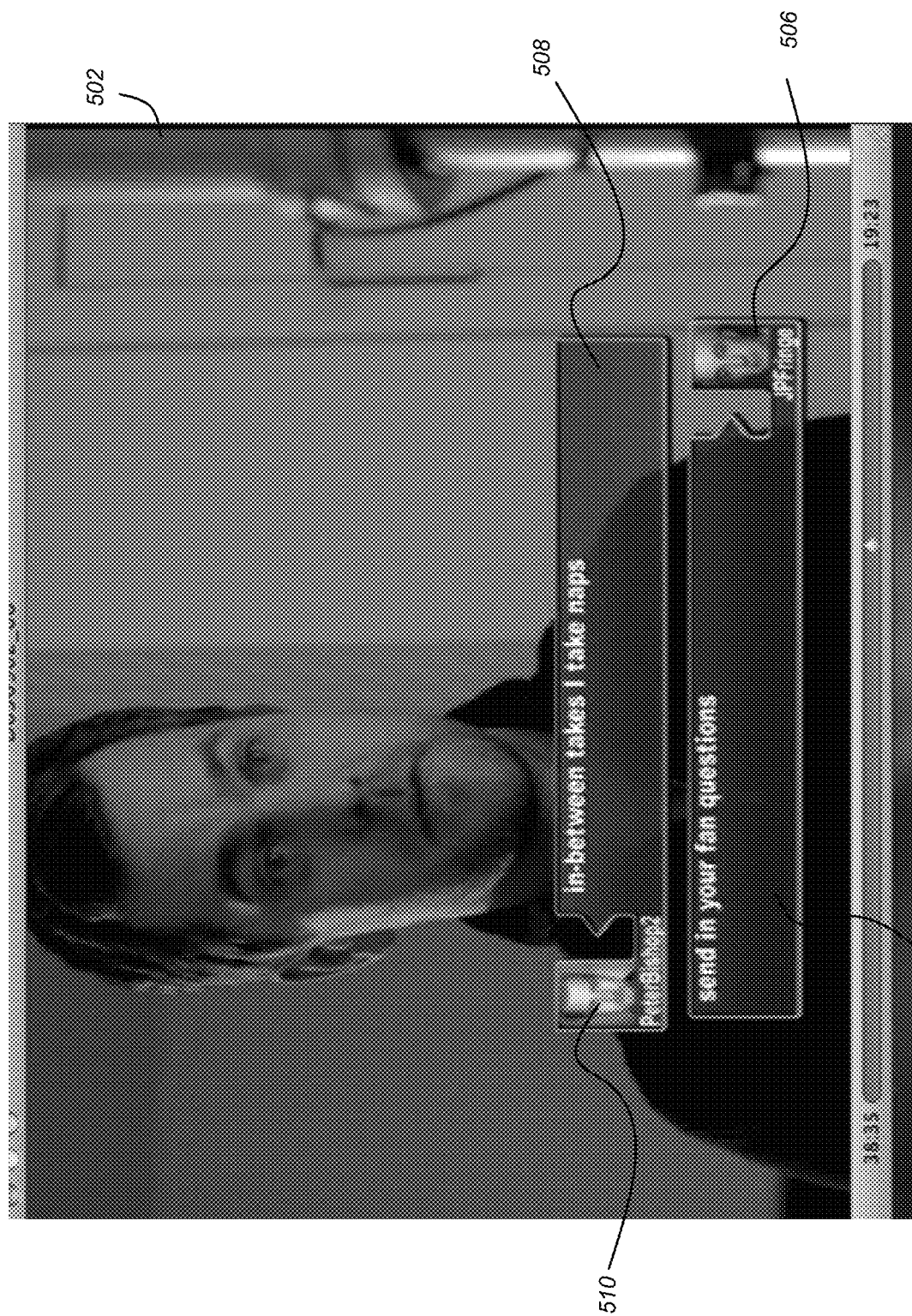
FIG. 5 is a diagram showing one embodiment of the depiction of the media program augmented with live commentary.

FIG. 5 is a diagram showing one embodiment of the depiction of the playback of a media program augmented with live commentary. The broadcast signal is reproduced in a media program player 502 allowing first group members 110 view the media program. The media program player may comprise the television 108, cellphone 112A or computer 112B, 130. The broadcast signal includes first window 504 in which the administrator, host, or producer 126 of the enhanced media program may enter messages or post administrator-selected messages for transmission. In the illustrated embodiment, the producer 126 has entered the text "send in your fan questions." An administrator avatar 506 may also be presented. Second group member 128 comments are presented in second window 508, which may answer questions posed by first group members 110 and selected by the producer 126. If desired, a second group member avatar 510 may be presented adjacent to the second window 508. In one embodiment, there is a single window 510 for each of the second group members, but in other embodiments, each second group member is provided with their own window.

Figure 6:
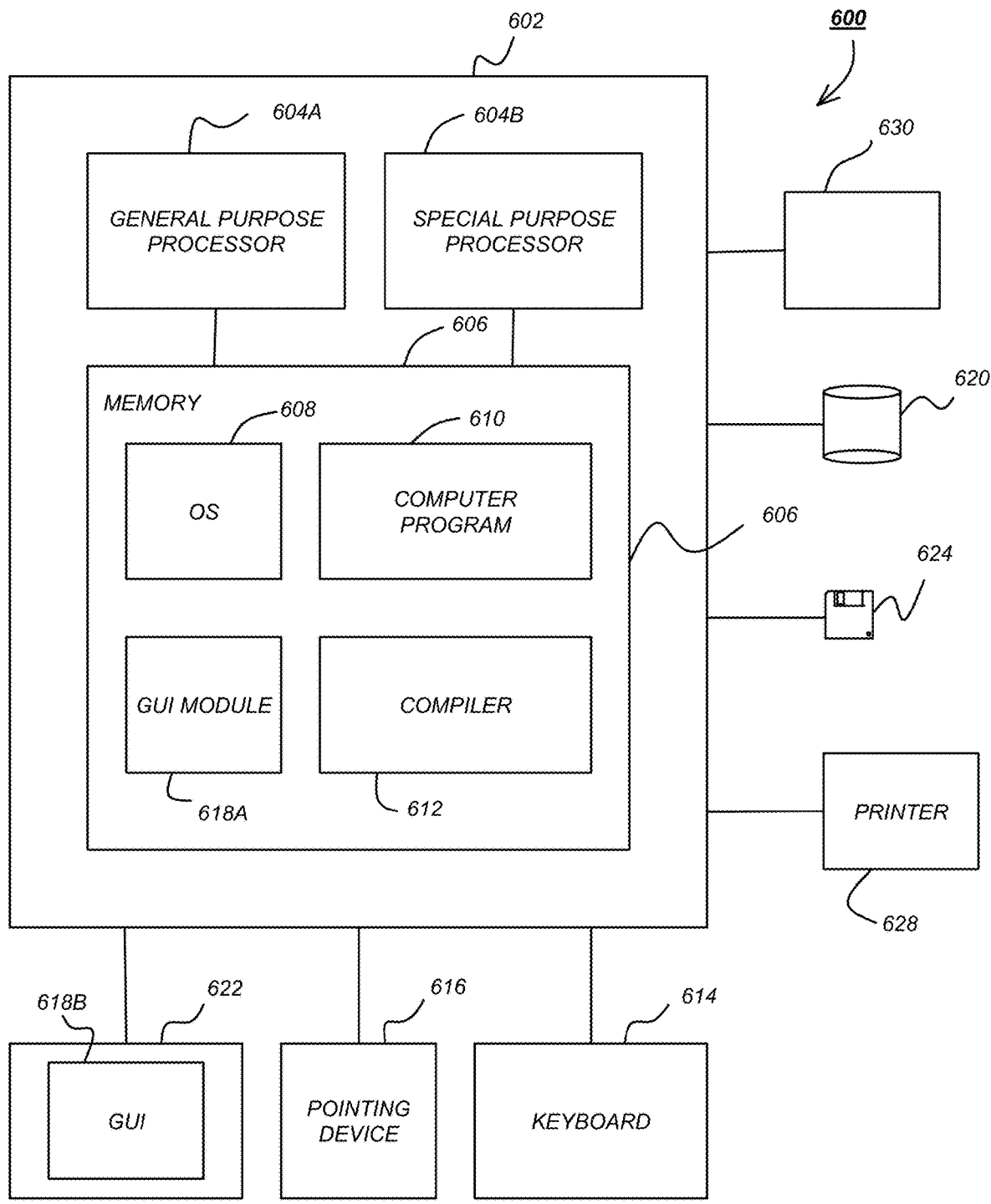
FIG. 6 is a diagram illustrating an exemplary computer system that could be used to implement elements of the present invention

FIG. 6 is a diagram illustrating an exemplary computer system 600 that could be used to implement elements of the present invention. The computer 602 comprises a general purpose hardware processor 604A and/or a special purpose hardware processor 604B (hereinafter alternatively collectively referred to as processor 604) and a memory 606, such as random access memory (RAM). The computer 602 may be coupled to other devices, including input/output (I/O) devices such as a keyboard 614, a mouse device 616 and a printer 628.

In one embodiment, the computer 602 operates by the general purpose processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608 to provide output and results.

Output/results may be presented on the display 622 or provided to another device for presentation or further processing or action. In one embodiment, the display 622 comprises a liquid crystal display (LCD) having a plurality of separately addressable pixels formed by liquid crystals. Each pixel of the display 622 changes to an opaque or translucent state to form a part of the image on the display in response to the data or information generated by the processor 604 from the application of the instructions of the computer program 610 and/or operating system 608 to the input and commands. Other display 622 types also include picture elements that change state in order to create the image presented on the display 622. The image may be provided through a graphical user interface (GUI) module 618A. Although the GUI module 618A is depicted as a separate module, the instructions performing the GUI functions can be resident or distributed in the operating system 608, the computer program 610, or implemented with special purpose memory and processors.

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 602 may also implement a compiler 612 which allows an application program 610 written in a programming language such as COBOL, C++, FORTRAN, or other language to be translated into processor 604 readable code. After completion, the application or computer program 610 accesses and manipulates data accepted from I/O devices and stored in the memory 606 of the computer 602 using the relationships and logic that was generated using the compiler 612.

The computer 602 also optionally comprises an external communication device such as a modem, satellite link, Ethernet card, or other device for accepting input from and providing output to other computers.

In one embodiment, instructions implementing the operating system 608, the computer program 610, and/or the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, or a flash drive. Further, the operating system 608 and the computer program 610 are comprised of computer program instructions which, when accessed, read and executed by the computer 602, causes the computer 602 to perform the steps necessary to implement and/or use the present invention or to load the program of instructions into a memory, thus creating a special purpose data structure causing the computer to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 602.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of presenting a media program concurrently with live commentary about the media program, comprising the steps of:
   broadcasting a signal comprising the media program;
   accepting first messages from a first group having a plurality of first group members, each viewing the broadcast of the media program;
   filtering the first messages from each of the first group members to identify a suitable message of interest to substantially all the first group members;
   accepting a second message from a second group having a plurality of second group members, each viewing the broadcast of the media program; and
   adding the identified suitable message from the first group and the accepted second message from the second group to a broadcasted signal in real time to concurrently present the media program, the identified suitable message from the first group and the accepted second message from the second group;
   wherein:
   the second group consists of individuals designated to have knowledge of a production of the media program and the accepted second message from the second group comprise responses to the identified suitable message of interest;
   the identified suitable message from the first group and the accepted second message from the second group is categorized according to a plurality of categories; and
   the broadcast signal comprises a plurality of caption channels, each of the plurality of caption channels associated with one of the plurality of categories.

2. The method of claim 1, wherein the identified suitable message of interest include a question from the first group directed to one or more members of the second group.

3. The method of claim 1, wherein the first messages are transmitted via SMS messages.

4. The method of claim 1, wherein the step of accepting first messages from the first group comprise the step of:
   designating a social networking service account for the broadcast of the signal comprising the media program; and
   harvesting the accepted first message from the social networking service account.

5. The method of claim 1, wherein the step of filtering the first messages to identify a suitable message of interest to substantially all the first group members comprises the steps of:
   keyword searching the first messages to identify message keywords;
   further identifying message keywords present in a number of first messages exceeding a threshold number of first messages;
   defining a plurality of categories of messages according to the further identified message keywords; and
   selecting at least one representative message from at least one of the plurality of categories.

6. The method of claim 5, further comprising the steps of:
   presenting the at least one representative message to an administrator for selection;
   accepting the administrator-selected message; and
   adding the administrator-selected message to the broadcasted signal.

7. The method of claim 1, wherein the second group includes individuals selected from a group comprising actors, producers, and writers.

8. The method of claim 1, wherein the broadcast is a rebroadcast of the media program.

9. A system for presenting a media program concurrently with live commentary about the media program, comprising:
a media program transmission system, coupled to a social networking system, for transmitting a broadcast signal having the media program; and
a social networking integration system, for accepting first messages from a first group having a plurality of first group members, each viewing a broadcast of the media program, for accepting second messages from a second group having at least one second group member viewing the broadcast of the media program, for filtering the first messages from the first group but not the second messages from second group to identify suitable messages of interest to substantially all the first group members, and for adding at least one of the filtered first messages from the first group members and the second messages from the second group members to the broadcasted signal in real time, thereby concurrently presenting the media program, the identified suitable messages and at least one message from the second group;
wherein:
the second group consists of at least one individual designated by the broadcaster to have knowledge of a production of the media program and the messages from the second group comprise responses to the filtered first messages;
the identified suitable messages from the first group and the accepted second messages from the second group are categorized according to a plurality of categories; and
the broadcast signal comprises a plurality of caption channels, each of the plurality of caption channels associated with one of the plurality of categories.

10. The system of claim 9, wherein the identified suitable messages consist of questions from the first group directed to one or more members of the second group.

11. The system of claim 9, wherein the first messages are transmitted via SMS messages.

12. The system of claim 9, wherein the social networking integration system for accepting first messages from the first group comprises a computer for designating a social networking service account for a rebroadcast of the media program and for harvesting messages from the social networking service account.

13. The system of claim 9, wherein the system further keyword searches the first messages to identify message keywords, further identifies keywords present in a number of first messages exceeding a threshold number of first messages, defines a plurality of categories of messages according to the identified message keywords, and selects a representative message from each of the plurality of categories.

14. The system of claim 13, wherein:
the social network integration system presents the representative message to an administrator for selection and accepts an administrator-selected message; and
the media program transmission system adds the administrator-selected message to the broadcasted signal.

15. The system of claim 9, wherein the second group includes individuals selected from a group comprising actors, producers, and writers.

16. The system of claim 9, wherein the broadcast is a rebroadcast of the media program.

17. An apparatus for presenting a media program concurrently with live commentary about the media program, comprising:
means for broadcasting a signal comprising the media program;
means for accepting first messages from a first group having a plurality of first group members, each viewing the broadcast of the signal comprising the media program;
means for filtering the first messages from each of the first group members to identify a suitable message of interest to substantially all the first group members;
means for accepting a second message from a second group having a plurality of second group members, each viewing the broadcast of the signal comprising the media program;
means for adding the identified suitable message from the first group and the accepted second message from the second group to a broadcasted signal in real time to concurrently present the media program, identified suitable message from the first group and accepted second message from the second group; and
wherein:
the second group consists of individuals designated to have knowledge of a production of the media program and the second messages from the second group comprise responses to the identified suitable message of interest;
the identified suitable message from the first group and the accepted second message from the second group is categorized according to a plurality of categories, and
the broadcast signal comprises a plurality of caption channels, each of the plurality of caption channels associated with one of the plurality of categories.

18. The apparatus of claim 17, wherein the identified suitable message of interest include a question from the first group directed to one or more members of the second group.

19. The apparatus of claim 17, wherein the first messages are transmitted via SMS messages.

20. The apparatus of claim 17, wherein the step of accepting first messages from the first group comprises:
means for designating a social networking service account for the broadcast of the signal comprising the media program; and
means for harvesting the accepted first message from the social networking service account.

* * * * *